June 21, 1960 S. P. JACKSON ET AL 2,942,165

LIQUID COOLED CURRENT RECTIFIERS

Filed Jan. 3, 1957

Inventors:
Stuart P. Jackson
Robert A. Barker
by Richard E. Hosley
Their Attorney 2,942,165

LIQUID COOLED CURRENT RECTIFIERS

Stuart P. Jackson, Lynchburg, Va., and Robert A. Barker, Lynnfield Center, Mass., assignors to General Electric Company, a corporation of New York Filed Jan. 3, 1957, Ser. No. 632,310

3 Claims. (Cl. 317—234)

The present invention relates to electrical current rectifiers and, more particularly, to arrangements for the mounting, cooling, and electrical connection of semiconductor rectifier cells.

Current rectifiers including relatively large area contact surfaces upon wafers of semiconductor materials are remarkable for their ability to pass extraordinarily large currents unidirectionally. Such rectifiers are of small size, operate with very high efficiencies, demand virtually no servicing, and possess other advantages characteristic of wholly static electrical devices. However, cells having current-conducting capacities which are large in relation to their physical sizes or thermal masses will tend to overheat and become destroyed unless the heat losses are dissipated at the rates at which they are generated. Heat-radiating fins have thus come into use with such cells, these fins being disposed to provide the necessary heat transfers to circulated cooling media. Both liquid and air cooling systems have been employed heretofore with such cells.

Rectifier apparatus of large output capacities and complex circuitry commonly include many rectifier cells, such as the well-known broad-area germanium cells, with the result that the constructions tend to become bulky and complicated. Further, access for servicing becomes limited, and shut-down intervals for routine cleaning and cell substitutions are likely to be unduly prolonged.

Accordingly, it is one of the objects of the present invention to provide improved liquid-cooled rectifier assemblies wherein heat losses are dissipated with high efficiencies in constructions of minimum bulk.

It is an additional object to provide improved sealed current rectifier cell units having integral heat dissipating pins disposed for ready coupling into a liquid-conducting conduit wherein thermal losses are quickly released.

By way of a summary account of this invention in one of its aspects, we provide a germanium rectifier wafer sandwiched between conductive contacts and hermetically sealed within an enclosure including an insulating member sealed with the contacts, and we affix to one of the aforesaid contacts a relatively massive heat-radiating member having a base portion in intimate electrical and thermal relationship to this contact and further having a plurality of parallel spaced pins projecting perpendicularly from the base portion. This cell unit cooperates with a hollow liquid-conducting conduit of rectangular transverse cross-section having a circular opening along one side thereof proportioned to admit the cooling pins and to be closed by the base portion of the heat-dissipating member. The liquid-conducting passage through the conduit is of rectangular cross-section also, and the cross-sectional dimensions thereof are so related to the proportions of the cooling pins that the closest spacing between the sides or end of any pin and the inner walls of the conduit is about the same as the closest spacing between the parallel equally-spaced pins. This assembly insures optimized heat transfers between the cooling pins and forced coolant by providing tortuous coolant flow paths of about the same pressure drop.

Although the features of this invention which are believed to be novel are expressed in the appended claims, details of the invention and the further objects and advantages thereof may be most readily appreciated through reference to the following description taken in connection with the accompanying drawings, wherein:

Figure 1:
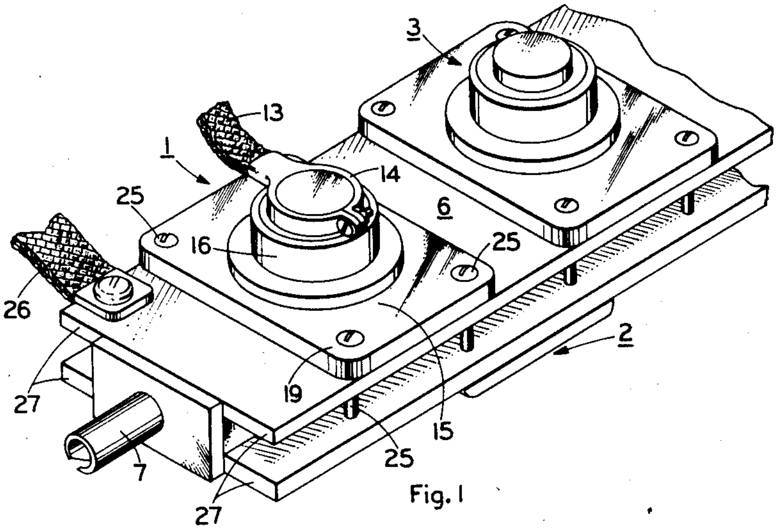
Figure 1 illustrates pictorially one current rectifier assembly constructed in accordance with these teachings.
Figure 2:
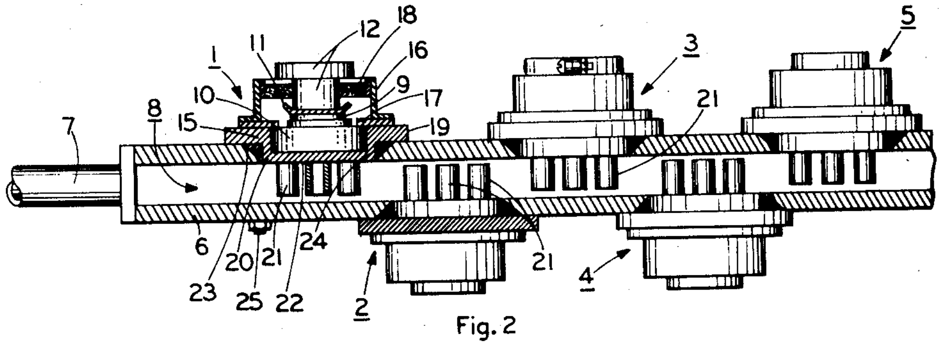
Figure 2 is a longitudinal cross-sectional view of the apparatus portrayed in Figure 1.

With reference to the assembly presented in Figures 1 and 2, it will be perceived that there are plural sealed rectifier cell units 1 through 5 mounted on opposite outer sides of an extruded hollow conduit member 6. Forced coolant fluid, such as perchlorethylene, is admitted to the interior of conduit 6 through an inlet 7, from whence it circulates past heat-dissipating elements and is ultimately recirculated over the same path via a suitable heat exchanger mechanism and pump of known constructions. The central coolant passage 8 within hollow conduit 6 is of a rectangular outline as viewed along a transverse cross-section of the conduit, and the dimensions thereof are closely related to certain proportions of the rectifier heat-dissipating bosses, as is discussed hereinafter.

Each of the cell units 1 through 5 includes a semiconductor wafer, electrical contacts, hermetic sealing members, and a special form of heat-dissipating and mechanical coupling element. Referring to unit 1, for example, it may be observed that the semiconductor wafer 9 is there sandwiched between soldered conductive contacts 10 and 11 disposed on opposite surfaces thereof, one of the soldered junctions being the locus of the customary unilateral conduction or rectifying action. Contact 11 is in turn connected with a terminal member 12 with which a flexible bus or cable 13 may be coupled by way of a clamp 14. Cylindrical contact 10, associated with the opposite wafer surface, is joined intimately with the heat-dissipating element 15 through a close fit within an accommodating recess therein, soldering or other fusion techniques being employed to bond the two together where desirable. Hermetic sealing, which protects the semiconductor and its junctions against contaminants, is achieved by the hollow cylindrical member 16, by the annular member 17 soldered to member 16 and contact 10, and by the ceramic insulating annulus 18 soldered between cylindrical member 16 and the central terminal 12.

Heat-dissipating member 15 possesses an enlarged rectangular base or flange portion 19 and a smaller central depending cylindrical portion 20 into which the cylindrical cell contact 10 is recessed. A group of parallel equally-spaced and equal-length bosses in the form of rods or pins 21, which are preferably integral with portion 20 of element 15, project perpendicularly outward from the planar outer surface 22 of portion 20, such that they are also perpendicular to the semiconductor wafer junctions. This cluster of rod-like bosses does not project beyond the circular outline of the aforesaid cylindrical portion 20 and is thus readily admitted into or withdrawn from the interior of conduit 6 through a circular opening in one flat side thereof. Outwardly chamfered surfaces 23 of this opening receive and become sealed with a deformable annular gasket 24 which is compressed against member 15 when the latter is drawn against conduit 6 by fastening bolts 25. The conduit opening is thereby completely closed and sealed by the cell unit, and it will be noted that the lower surface 22 of the cylindrical portion 20 of the cell unit is aligned with an inner surface of conduit 6 such that fluid flow is not obstructed thereby.

Figure 3:
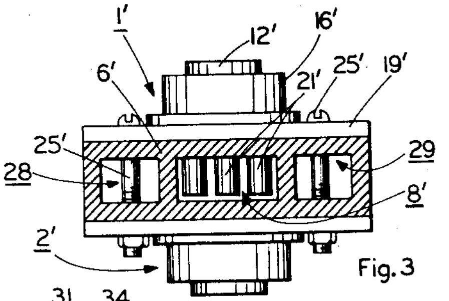
Figure 3 is a transverse cross-section of another cell and conduit assembly embodying the present teachings.

One contact of each of the cell units, such as contact 10 of unit 1, is brought into firm conducting engagement with the conducting conduit 6 which then serves as an electrical bus common to the cell units. This engagement occurs between the flange portion 19 and the conduit surfaces to which the flange portion 19 is bolted, and the bus-conduit 6 is in turn coupled into external circuitry through a cable or bus 26 fixed with the conduit. To achieve and preserve the required sealings and electrical connections, the fastening of the cell units to the conduit must be particularly secure, yet it is desirable that the numerous fastening bolts 25 be situated outside the coolant passage 8 where they might otherwise deflect the cooling liquid from its optimum courses and might necessitate further sealing to prevent escapement of the liquid from the conduit. These advantages are realized in the conduit construction wherein there are integral extensions 27 of two opposite parallel conduit sides, these extensions projecting outwardly from the confines for the central coolant passage for a sufficient distance to permit the fastening bolts 25 to pass between and to be fastened with them. Such extensions also tend to aid in the cooling process. An alternative conduit construction of like effectiveness appears in a transverse cross-sectional view in Figure 3, those elements corresponding to elements of the construction of Figures 1 and 2 being identified by the same reference characters having distinguishing prime accents. It will be perceived that the extruded conduit 6′ is there provided with three openings: a central sealed liquid-conducting passage 8′, and two unsealed side passages 28 and 29 through which the fastening bolts 25′ pass.

Figure 4:
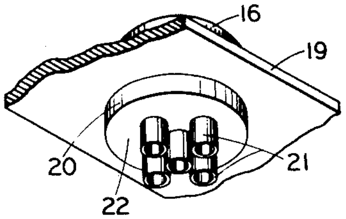
Figure 4 is a partial pictorial representation of a cell unit such as those shown in Figures 1 and 2, with the lower end exposed to view.

Temperatures of potentially destructive proportions tend to build up with astonishing rapidity within each of the cell units, and it is thus essential that the release of such heat to the cooling medium be entirely effective to preclude cell failures. The principal heat exchanges for this purpose occur between the circulated liquid and the cooling bosses 21 of the various cell units in Figures 1, 2, and 4. Bosses 21 are parallel to one another, are equally spaced in each cell unit, and are of the same length just short of touching the conduit wall opposite that through which they are mounted. For each cell unit the cluster of bosses 21 effectively provides a barrier through which the coolant stream must pass by subdividing into a plurality of smaller higher-velocity streams. As the coolant velocity is increased in this manner past the surfaces to be lowered in temperature, the cooling effect is advantageously heightened, and the numerous cooling bosses provide a large total surface area which materially contributes to the efficient heat dissipation. Bosses 21 may be hollowed in furtherance of these effects, as is best perceived in view of Figure 4.

If optimized release of generated heat to the liquid coolant is to occur, the fluid stream must subdivide into numerous paths of about the same velocity and quantity of flow per unit of time, else one cooling boss or group of bosses tends to be more efficiently cooled than those remaining in a cluster, and localized hot spots may develop. It is for this reason that the bosses 21 for each cell unit are spaced in relation to one another and in relation to the side walls of the coolant passage such that the multiple paths into which the coolant stream subdivides in passing through them offer about the same pressure drop. A cluster of five bosses, such as that shown in Figure 4, may be satisfactory when the closest spacing between bosses is also about the same as the closest spacing between the bosses and passage side walls and between the ends of the bosses and the passage wall opposite these ends. In this respect, then, the cooling boss dimensions and the dimensions of the coolant passage are related to one another. Other numbers of bosses may of course be utilized for each cluster.

Figure 5:
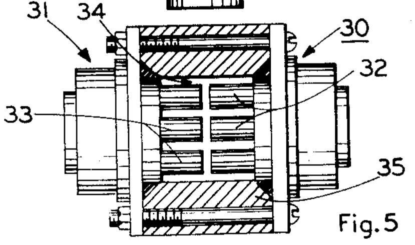
Figure 5 provides a transverse cross-sectional view of a further assembly wherein cell units are oppositely disposed within a conduit.

Although the arrangement portrayed in Figures 1 and 2 involves the mounting of successive cell units on opposite sides of a small conduit, whereby certain space savings are realized, it may also prove further advantages in some applications to mount cell units directly opposite one another in the type of assembly illustrated in Figure 5. Two cell units 30 and 31 are exposed in this transverse cross-sectional view, mounted with their cooling bosses 32 and 33, respectively, projecting into the coolant passage 34 from opposite sides of the conduit 35. In this instance, the space between ends of the bosses 32 and 33 is about the same as the closest spacing between adjacent bosses and the closest spacing between the bosses and side walls of the coolant passage. Also, the side walls of the deeper conduit, 35, are made of sufficient thickness to accommodate the fastening bolts 36 without need for liquid sealing. The cell unit constructional details correspond to those described earlier herein with reference to cell unit 1.

Those skilled in the art will recognize that the specific embodiments selected for detailed discussion may be altered in many respects while yet practicing these teachings. For example, each cell unit may be externally threaded for fastening with mating internal threads about the conduit aperture through which it is mounted. And, cooling bosses or rods may be of shapes other than cylindrical, and may be solid rather than hollowed. Accordingly, modifications, combinations, and substitutions may be effected without departure from the spirit or scope of the invention as recited in the appended claims.

What we claim as new and desire to secure by Letters Patent of the United States is:

1. Current rectifier apparatus comprising a conduit having a passage therethrough for conducting a stream of forced liquid coolant, said conduit having at least one aperture through a wall thereof, at least one unilaterally conductive cell having oppositely disposed contact surfaces, means for making electrical circuit connections with said cell surfaces, a heat-dissipating member having one side fixed in a supporting and heat-conducting relationship with said cell and having a plurality of equally spaced bosses projecting perpendicularly from an opposite side thereof, means mounting said member on said conduit through said aperture with said bosses disposed in said coolant passage and said cell disposed outside said conduit, said bosses being disposed to pass through said aperture unobstructed, and said bosses and said coolant passage being spaced relative to one another such that the closest spacing between the sides or end of any boss and the inner walls of the passage is about the same as the closest spacing between the parallel equally spaced bosses to form a plurality of fluid paths of about the same pressure drop for said coolant when said bosses are disposed in said coolant passage.

2. Current rectifier apparatus comprising an electrically conductive conduit having a passage of rectangular cross-section therethrough for a forced liquid coolant, said conduit having at least one circular aperture through a wall thereof, at least one unilaterally conductive cell having oppositely disposed contact surfaces, a pair of contacts each engaging a different one of said surfaces, means intermediate said contacts hermetically sealing said cell and preserving an electrically insulated relationship between said contacts, a heat-dissipating electrically conductive member having one side fixed in a supporting and conducting relationship with one of said contacts and having a plurality of integral equally spaced parallel bosses projecting perpendicularly from an opposite side thereof, said member having a flange intermediate said sides, means conductively securing said flange means to the outside of said conduit with said bosses disposed in said coolant passage and said cell disposed outside said conduit, said bosses being disposed in a circular cluster of lesser diameter than said aperture to permit their passing through said aperture, and said bosses and said rectangular passage being spaced relative to each other to form together a plurality of fluid paths wherein the smallest dimensions between the sides or end of any base and the rectangular passage are about the same as the cloest spacing between said bosses, and means for making electrical circuit connections with said conduit and with the other of said contacts.

3. Current rectifier apparatus comprising an electrically conductive conduit having a passage of rectangular cross-section therethrough for a forced liquid coolant, said conduit having at least one pair of oppositely disposed apertures through the walls thereof; at least one pair of like rectifier cell units each including a unilaterally conductive cell having oppositely disposed contact surfaces, a pair of contacts each engaging a different one of said surfaces, means intermediate said contacts hermetically sealing said cell and preserving an electrically insulated relationship between said contacts, a heat-dissipating electrically conductive member having one side fixed in a supporting and conducting relationship with one of said contacts and having a plurality of integral equally spaced parallel bosses projecting perpendicularly from an opposite side thereof; means conductively securing said member of each of said cell units to said conduit in position to project through a different one of said opposite apertures with said bosses disposed in said coolant passage and said cells disposed outside said conduit, said bosses of each of said cell units being disposed to pass through one of said apertures unobstructed, and said rectangular coolant passage and said bosses of said cell units being proportioned and spaced relative to one another such that the closest spacing between the sides or end of any boss and the inner walls of said coolant passage is about the same as the closest spacing between the parallel equally spaced bosses to form together a plurality of coolant paths about said bosses of about the same pressure drop; and means for making electrical circuit connections with said conduit and with the other of said contacts of each of said cell units.

References Cited in the file of this patent

UNITED STATES PATENTS

| | | |
|---|---|---|
| 1,649,741 | Ruben | Nov. 15, 1927 |
| 1,845,573 | Ackerly | Feb. 16, 1932 |
| 2,780,757 | Thornhill et al. | Feb. 5, 1957 |
| 2,783,418 | Peter et al. | Feb. 26, 1957 |